Patented Apr. 15, 1924.

1,490,330

UNITED STATES PATENT OFFICE.

PAUL KREISMANN, OF CHICAGO, ILLINOIS.

GLUE AND PROCESS OF MAKING SAME.

No Drawing. Application filed May 24, 1919. Serial No. 299,573.

*To all whom it may concern:*

Be it known that I, PAUL KREISMANN, a citizen of the United States, residing at Chicago, in the county of Cook and State of Illinois, have invented certain new and useful Improvements in Glue and Processes of Making Same, of which the following is a specification.

This is a continuation in part of my application Serial No. 286,134, filed March 29, 1919.

There is an urgent and constantly increasing demand for a vegetable substitute for animal glue, owing to the scarcity of materials for making animal glue, and my invention has for its object to provide a vegetable glue of superior quality and a process for making same in an inexpensive and convenient manner for veneer and other work.

I have found that a vegetable glue of superior quality can be produced at comparatively low cost with potato starch, a fibrous material, an alkali and water which will answer the purpose of animal glue for veneer and other work.

And I have also found that the fibrous material which is left as a residue when the starch is separated from crushed and finely divided raw potatoes is very satisfactory for the purpose.

In the manufacture of potato starch, as usually practiced at the present time, the potatoes are crushed or reduced to a finely divided condition and then screened and treated with cold water to separate the starch from the fiber. The starch is then dried in some approved manner and the fibrous pulp residue is disposed of as waste material. Since potatoes consist of approximately 78 parts water, 13 parts starch and 9 parts fibrous residue by weight, there is at hand an ample supply of this fibrous residue available for use in accordance with my invention.

I have discovered that a base for making glue can be satisfactorily produced with a dry mixture of from 60 to 95 pounds of potato starch and 40 to 5 pounds of the fibrous residue, to which is added 3 to 5 pounds of a suitable alkali to every 100 pounds of the mixture. The fibrous residue, which is separated from the starch of the potato according to the prevailing practice, is dried and preferably ground or otherwise reduced to a fine condition before being mixed with the potato starch.

Instead of separating the starch and fibrous residue, as above described, potatoes may be crushed or otherwise finely divided, the water removed, and then to the starch and fibrous material remaining a sufficient quantity of starch may be added to produce a base having the proper proportions of starch and fibrous material herein mentioned. Since there are known to be approximately 13 parts of starch to 9 parts of fibrous residue in raw potatoes grown in the United States, it is a simple matter to add sufficient starch to conform with the proportions heretofore indicated.

In preparing the glue I have found it satisfactory to proceed as follows:—

I preferably use a kettle having a steam jacket and an agitator and operate the agitator throughout the process. I use from 250 to 600 pounds of cold water to 100 pounds of the base. The cold water is first put in the kettle, the agitator operating, then the base is added and steam is admitted to the jacket to raise the temperature preferably to 144° F. The alkali is dissolved in cold water in the proportion of one part of alkali to about three parts of water, by weight, and this solution is then slowly added to the mixture in the kettle in the proportion of 3 to 5 pounds of alkali to 100 pounds of the base. Meanwhile the temperature will rise to 165° F. or thereabouts. My experience has been that the best results are obtained when the temperature has reached 165° F., but it is well known that conversion will take place at a lower temperature as well as at a somewhat higher temperature. The conversion will be indicated when the solution will run off of a paddle or a stick in a long tenacious thread, whereupon the steam is turned off and cold water admitted to the jacket to slowly cool the mass to 90 to 100° F., or thereabouts, ready for use. I have referred to a jacketed kettle as a convenient means for practicing the process but any other means suitable for the purpose may be employed.

If the alkali is first mixed with the base, in a dry state and as a part thereof, either by the manufacturer or by the consumer, this base is added to the water in the kettle and the temperature is raised sufficiently to effect the conversion as heretofore described.

The proportions herein mentioned are those which my present investigations and practical work with the improved glue and process have proved to produce what I now consider to be the most satisfactory results, but it will be understood by those skilled in the art that the proportions of the materials and the temperatures may be varied as will be found desirable according to the character and quality of the materials used, the grade of glue desired and the conditions of manufacture.

I prefer to prepare a base of potato starch and fibrous material, with or without the alkali, as before described, but if desired these materials may be supplied separately and combined for the first time in the kettle. The starch, fibrous material and alkali may be put in the kettle in any order desired.

As before mentioned, the alkali may be included with the potato starch and the fibrous material as a part of the base prepared as a dry mixture by the manufacturer and shipped complete in large quantities to consumers and by them converted in such quantities as may be required from day to day in or about the manner described. Thus it is unnecessary for the consumer to rely upon his own employees to produce a proper mixture of the materials, and he is always assured of a constant uniformity of mixture which is highly desirable both to the manufacturer and to the consumer. Or, the alkali may be added to the base of potato starch and fibrous material by the consumer, if desired.

My invention not only greatly reduces the cost of producing a vegetable glue by reason of the use of a comparatively inexpensive potato starch and fibrous material, but the combination of potato starch and fibrous material makes a base for producing a glue of very superior quality suitable for high grade work as well as for ordinary work. The addition of the fibrous material imparts to the glue an adhesive quality and a body which it would not otherwise possess. And while the glue is especially suitable for veneer work I have found that it can also be used for some classes of joint and other work where a spreader is employed for applying the glue. By using more water a thinner glue can be produced which is suitable for other than veneer and joint work, such as box shooks and paper boxes, for example.

I claim:

1. A base for making glue consisting of an admixture of potato starch and a fibrous material, there being more starch in proportion to the fibrous material than is present in the raw potato, substantially as described.

2. A base for making a glue consisting of an admixture of potato starch and the fibrous material of potato, there being more starch in proportion to the fibrous material than is present in the raw potato, substantially as described.

3. A base for making glue consisting of an admixture of potato starch and the fibrous material of potato in a finely reduced condition, there being more starch in proportion to the fibrous material than is present in the raw potato, substantially as described.

4. A base for making glue consisting of an admixture of potato starch, potato fibrous material, and an alkali, substantially as described.

5. A glue comprising an admixture of potato starch, a fibrous material and an alkali rendered semi-fluid by conversion, there being more starch in proportion to the fibrous material than is present in the raw potato, substantially as described.

6. A glue comprising an admixture of potato starch, the fibrous material and an alkali of potato rendered semi-fluid by conversion, there being more starch in proportion to the fibrous material than is present in the raw potato, substantially as described.

7. A glue comprising an admixture of potato starch, the fibrous material and an alkali of potato in a finely reduced condition, said admixture being rendered semi-fluid by conversion, there being more starch in proportion to the fibrous material than is present in the raw potato, substantially as described.

8. The process of making a vegetable glue which consists in preparing a mixture of potato starch, potato fibrous material, an alkali and water and subjecting the mixture to heat until the mixture is rendered semi-fluid by conversion.

9. The process of making a vegetable glue which consists in preparing a mixture of potato starch, the fibrous material of potato finely reduced, an alkali and water and subjecting the mixture to heat until the mixture is rendered semi-fluid by conversion.

10. The process of making a vegetable glue which consists in mixing potato starch, the fibrous material of potato finely reduced, an alkali and water in or about the proportions of 60 to 95 pounds of potato starch and 40 to 5 pounds of fibrous material with 3 to 5 pounds of alkali and 250 to 600 pounds of water to every 100 pounds of the mixture of potato starch and fibrous material, agitating and raising the temperature of said mixture to approximately 165° F., and then cooling the mixture.

PAUL KREISMANN.

Witness:
M. A. KIDDIE.